X 0009398
W. Keane.
Swaging Screws
Patented Feb. 13, 1856
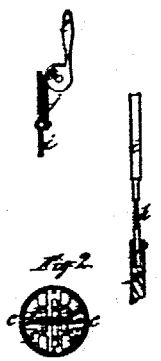
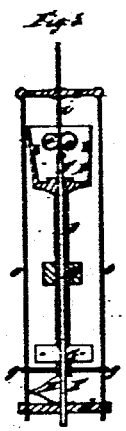
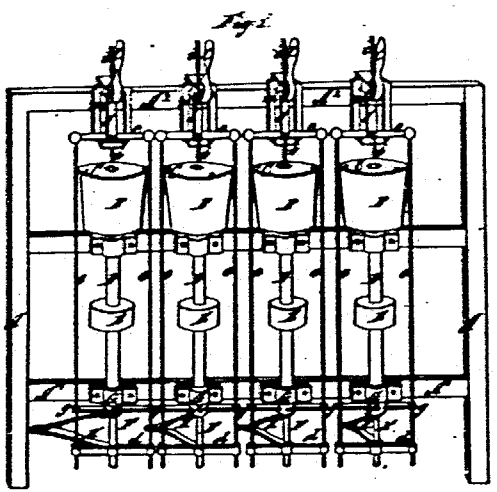
THE GRAPHIC CO. PHOTO-LITH. 39 & 41 PARK PLACE, N.Y.

15

{Refused April 16th 1835} Feb 13. 1836 429

William Keane Monroe N. Y.

9398X

Letters Patent

The schedule referred to in these Letters Patent and making part of the same
Containing a description in the words of the said William Keane himself
of his improvement in the machine for making Screws.-

Be it known that I William Keane of the Town of Monroe County of Orange
and State of New York have invented a new and useful improvement in
the machine for making Screws which is described as follows: reference
being had to the annexed drawings making part of this Specification. A
represents the frame of the machine B.B. the Cylindrical dies having the
impression of the required screw struck into their peripheries. These dies
are about 1 3/4 inch diameter & 1/2 an inch thick made of cast steel hard-
[illegible] perfectly true so that when the dies are set edge wise together they form a
circular cavity into which the tap is inserted [illegible] the required impression
to the dies. The dies have a 3/4 inch hole in their centre into which a
shaft is inserted C.C. 2 1/2 inches long and upon the centre of which shafts
the dies are fixed. These shafts with the dies revolve on centres D.D.D.D.
fixed by means of bolts E.E.E.E. to a circular plate F. The shafts are placed
parallel with each other so that the cavities in the dies form a circular hole
directly over the centre of the iron plate F and the screw when being cut
forms a centre upon which the dies perform a horizontal rotative motion
and cut the thread on the screw as the spindle, hereafter mentioned is
forced upwards the dies when at work are immersed in water and
oil in order to prevent the screw and dies becoming hot for which purpose
I have constructed a box G 7 inches in length and six inches diameter
cast with a bottom, thro' which the spindle passes and a [illegible] H having
an aperture in its centre thro which passes the centre rod. I [illegible] spin
dle K 2 feet long 1 1/4 inch diameter having 3/4 inch hole through its
centre lengthwise standing vertically having a bearing at its bottom
and another near the top with a pulley L near the centre by which it is driven [illegible] into the Cylindrical hollow oil or water box P. about
2 or 3 inches and is then fastened. This Spindle being hollow as before men-
tioned has passed thro' its Centre an inward rod J. having a stub screw
C.A. at the top to govern the dies, and is connected to a lever O. which bears
up the Centre rod and keeps the stub screw between the dies as they rise and press on
the rod or bar which is intended to receive a thread. P. lever connected
to the bottom of the Spindle and supports it; being connected to the lower
end of a lever Q. The lever P. has a weight R. on its outer end for the purpose
of bearing the Spindle upwards as the screw is cut. The handle S at the
top of this lever is for bringing the Spindle downward for the purpose of taking
the finished screw out and putting in another rod to be formed into a screw.
This lever is also jointed and connected as represented at T. U. M. cast on pro-
jection on the cylindrical iron box thro' which the Spindle passes up into
the box about 2 or 3 inches and serves to keep the Spindle true with the box
it also serves as the upper bearing upon which it runs as well as slides up
and down during the operation of the machine. V. an iron casting through
which the Spindle passes, it has a bearing or step at the bottom by which
the Spindle receives its vertical motion, which casting is also connected
to the lever, whose handle is represented at S. W. Collar fastened on the
spindle to keep it from lifting out of its step at the bottom. DC drums by which
the Spindles are driven at the rate of about 500 revolutions per minute for
common screws. Y beam to which is attached fixtures for holding the
screw during the operation of cutting, which fixtures are common screw
drivers with a cross head and held permanent by a screw on the top. Z
[illegible] of the frame which supports the levers before described. a the latch
with a hole in one end and fastened by means of a set screw to the centre rod pass-
ing thro' the spindle to keep it from turning; the other end of which latch
runs in a perpendicular slide and also prevents the centre rod from
rising farther than is necessary by coming against the bottom of the
spindle step. C. is a view of the two dies in their places on the circular iron
plate which is set into the cylindrical iron box for [illegible] to admit
a screw as before mentioned; When both dies are of the same
diameter having the same number of threads in each of those grooved

[illegible] together by cog wheels fixed on the [illegible] of the shafts of the dies in order to keep
the threads in the dies from passing each other but at present I use the
[illegible] screw which answers a very good purpose . . . . . .
Operation The piece of iron to be formed into a screw being first secured
on the top of the [illegible] guide screw N by its point pressing against the
bottom of the screw from the action of the weight R & lever P, and by the screw
[illegible] at the top of the machine; the main drum X is put in motion
by steam, water or other power; this drives the small pulleys G on the spin-
dles K, these turn the spindles with their cutters C and dies B horizontally
the dies at the same time having a vertical movement on the [illegible] guide
screw N. the dies pass from this the piece of iron to be made into a screw thus
continuing the operation till the thread is entirely cut. The spindles and
dies are then depressed by drawing forward the lever [illegible] the cut screw is
taken out another piece of iron put in and the before described operation
repeated.

What I claim as my invention and not previously known
and which I desire to secure by Letters Patent consists in the combination
and arrangement of the several parts of the machine as before described
for making screws, particularly the mode of giving the dies a simulta-
neous horizontal & vertical movement [illegible] and [illegible] whilst cut-
ting the screw by which means the screw is cut correctly at the same
time that the dies are kept cool.

William Keane

Exd
M.G.C

Witnesses
Wm P Elliot
Thos Crown 1245 words

Drawing (Granted February 13. 1836)